Dec. 1, 1959 A. O. BRUHN 2,915,256

FILM FASTENER FOR REELS

Filed July 30, 1956

INVENTOR.
Arne O. Bruhn
BY Scott L. Norviel
atty

United States Patent Office 2,915,256

Patented Dec. 1, 1959

2,915,256

FILM FASTENER FOR REELS

Arne O. Bruhn, Phoenix, Ariz.

Application July 30, 1956, Serial No. 600,970

2 Claims. (Cl. 242—74.2)

This invention concerns holding clips for the hub portions of motion picture film spools or reels.

Heretofore motion picture spools or reels, especially the smaller ones for 8 mm. films, have been provided with slots in the hub portions which parallel the axis of the spool into which the end of the film is inserted for winding or rewinding. It is to be understood that the end of the film which is to be wound on the spool cannot be firmly attached to the hub, but must be releasably attached so that when the film is wound from the spool and the end is approached it will easily come from the spool without breaking the film or without dislocating the spool on its spindle.

I have found that, particularly in the case of the small film, it is very difficult at times to insert the end of the film in the slot provided and then roll one layer of the film over the slot. Usually the operation of inserting the film end in the slot must be done under poor lighting conditions and in a position in which neither the film nor the psool itself may be held steady.

In view of the foregoing, one of the objects of my invention is to provide a clip which is attached to the spool adjacent the hub portion and which has a bar extending transversely of the hub and resiliently bearing on its surface and arranged so that the film end may simply be slipped beneath the bar when the winding is started.

Another object of my invention is to provide a clip consisting of a small metal bar having a resilient arm adapted to be fixed to the spool or reel hub having a bar which is resiliently held on the face of the reel hub while the arm may be readily grasped by the fingers of the user in order to raise the bar from the face of the reel hub when attaching a film end.

Still another object is to provide a clip which may be readily attached to the hub portion of a motion picture reel and which has a metal element extending axially across the face of the hub supported so that it may be easily released and moved upward from the face of the hub when desired.

I attain the foregoing objects by means of the devices and the particular construction of parts and the combination of parts shown in the accompanying drawings in which—

Similar numerals refer to similar parts in the several views.

Figure 1:
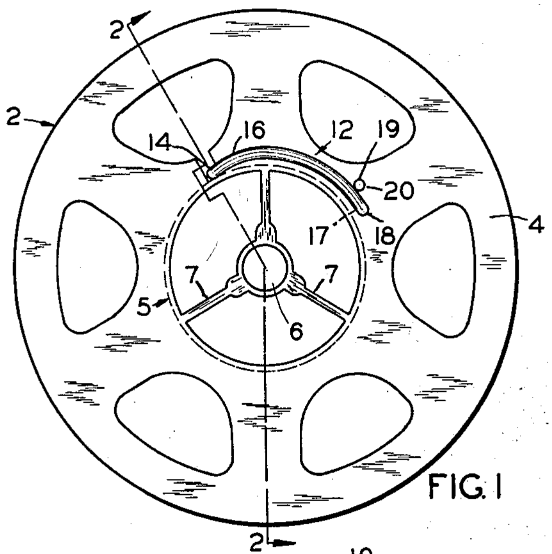
Figure 1 is a side elevation of a motion picture film reel with a film end holding clip incorporated thereon.

The reel body 2 is composed of two end flanges 3 and 4 held together centrally by a hub 5. Within the hub there is a smaller circular bearing 6 which is supported within hub-ring 8 by a plurality of radial webs 7.

The reel, when used, is journalled on a shaft which extends through the bearing 6.

Film is wound over the outer surface 10 of the cylindrical hub ring 8.

Figure 2:
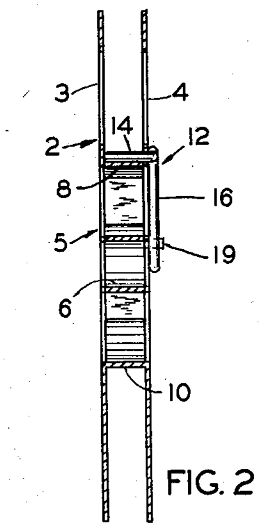
Figure 2 is a side elevational view thereof with portions sectioned substantially on line 2—2 of Figure 1.
Figure 3:
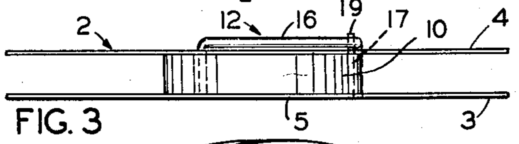
Figure 3 is a plan view of the reel and clip.

In order to hold the end of the film in on the hub when winding is started I provide a clip, generally indicated in Figures 1, 2 and 3 by numeral 12, which is substantially U-shaped when viewed from the top, and is arcuate when viewed from the side as shown in Figure 1. A film clamping bar 14 extends from the front end of arcuate arm portion 16 of clip 12 transversely across face 10 of hub ring 8. At the opposite end of arm 16 there is an attaching bar 17 which is inserted in a hole 18 in the body 2 adjacent to hub 5. A positioning and holding pin 19, set into a hole 20 in body 2 adjacent to hub 5 bears against the top of arm 16 near bar 17 and holds arm 16 downward so that clamping bar 14 is normally held down onto face 10 of hub ring 8.

Spring wire is the preferred material from which the clip 12 is made and provides sufficient spring-like action in arm 16 to furnish the resilience required to maintain the clamping bar 14 in contact with hub surface 10.

In use, arm 16 is raised by the thumb of the hand holding the reel and the clamping bar 14 is raised from the face 10 of the hub. When this is done the end of the film to be wound on the reel may be easily inserted under bar 14 and will be held so that the winding of the film may be easily started. After the first turn the subsequent convolutions of the film will hold the bar firmly in position.

When the film is unwound from the reel, after the innermost turn is removed, the film end easily pulls from beneath bar 14 and does not hold or hang up so as to cause breakage of the film or displacement of the reel on its shaft.

In the form of the device shown in Figures 4 through 12 I have provided a means for holding down the film in a similar way to that previously described, but in this form the hold-down arm may be moved entirely clear of the surface of the hub ring and it is not necessary to insert the film end under the bar.

To accomplish this I provide an L-shaped clamp 29 having a hold-down bar 30 which may be operated by a thumb bar 31 and which is pivoted at 32 and supported on a bearing bracket 34.

The bearing bracket is in turn supported on a simple spring bracket 36 which is inserted in a slot 33 cut in hub ring 8. A spring 37*a* normally holds the bar 30 downward in bearing on the face of the hub ring.

The installation of this type includes the removal of a portion of the spool end as indicated at 38. Slot 33 is then cut in the hub ring 8. The spring bracket 36 is then inserted in this slot and provides a transverse socket 41 for the receipt of the base 35 of bearing bracket 34. The bearing bracket has two upturned ears 44 to provide end supports for bearing pin 37. The pin 37 is supported in ears 44 and extends through the bearing portions 45 of the L-shaped clamp 29. The spring 37*a* surrounds the bearing pin 37 and one end, marked 46, bears against the hub 5 at a position marked 47 in Figure 11. The other end bears against the outer face of the thumb plate 31. In this way the L-shaped bracket is normally urged counter clockwise, as viewed in Figure 11, so that the hold-down bar 30 is normally urged downward toward the outer face of the hub ring 8.

Figure 4:
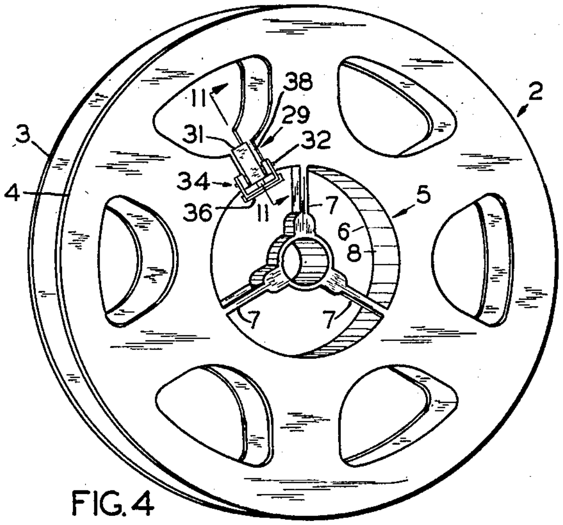
Figure 4 is a perspective view of a film reel equipped with a modified form of film holding clip.
Figures 5, 6, 7, 8, 9, 10:
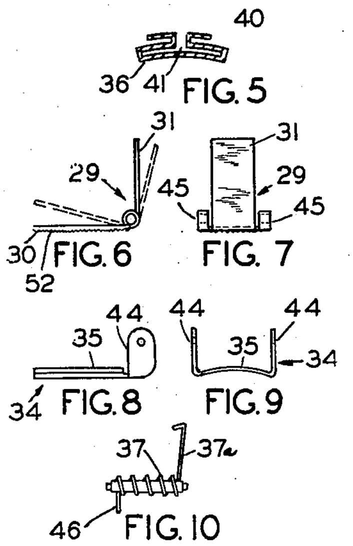
Figure 5 is a sectional view of a fragment of the hub rim, showing an attaching bracket for the modified clip.
Figure 6 is a side elevation of the modified clip.
Figure 7 is a front elevation of the clip.
Figure 8 is a side elevation of the supporting bracket for the modified clip.
Figure 9 is an end view thereof.
Figure 10 is a side elevation of the hinge pin and spring for said clip.
Figure 11:
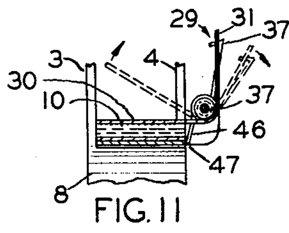
Figure 11 is a sectional view of said clip and a fragment of the reel hub taken substantially on line 11—11, Figure 4.
Figure 12:
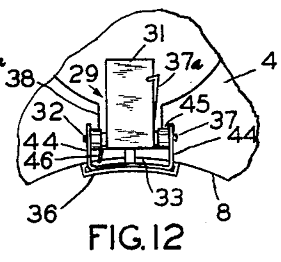
Figure 12 is a side elevational view of the clip and hub as shown in Figure 11.

When it is desired to wind film on a reel, with this type of clamp, Figure 4, it is only necessary to press downward on the thumb bar 31. This will raise the hold-down bar 30 entirely off of the face of the hub ring 8. The dotted lines, Figure 11, indicate intermediate movement positions of these parts. The film is then merely laid in the reel on the face 10 of ring 8 and the bar 31 released. Spring 37*a* immediately forces the hold-down bar 30 onto the film and holds it sufficiently so that it will not slip out of place when winding is started. After the first turn of the winding the bar 30 is held down tightly by the film itself. When the film is unwound from the reel, and the end is reached, the end of the film easily slips from beneath the hold-down bar 30 and is freed from the reel. When desired teeth 52 or an equivalent roughened surface may be provided for the bottom face of bar 30. This aids in holding slick and stiff film.

I claim:

1. In a motion picture film reel having a hub, a clamping clip for holding the end of a strip of film preparatory to winding said film on said reel, including an arcuate arm of spring wire disposed on one side of said film reel having an attaching bar at one end inserted into one side of said reel adjacent said hub, and a film clamping bar at the opposite end of said arm extending transversely across the face of said reel hub, and a hold down pin set into the side of said reel bearing on said arcuate arm so that said film clamping bar is normally resiliently held in contact with the face of said hub; said film clamping bar being adapted to be raised from the reel hub to release film clamped beneath it by pressure applied by the thumb of the user to said arcuate arm.

2. In a motion picture film reel having a body including a pair of spaced flanges centrally joined by a hub, a film clamping clip for holding the end of a film to be wound on said reel consisting of an arcuate bar of resilient material having a clamping bar at its free end disposed at right angles relative to the mid-portion of the bar and adapted to extend transversely across the outer face of said reel hub, and an attaching bar at the other end extending at right angles to the mid-portion of said arcuate bar, and pivotly engaging one flange of said reel, and a hold-down pin set into said flange radially outward from said arcuate bar and pressing on said arcuate bar so that said clamping bar resiliently presses on the outer face of said reel hub.

References Cited in the file of this patent

UNITED STATES PATENTS

| | | |
|---|---|---|
| 1,216,967 | Dunavant | Feb. 20, 1917 |
| 1,835,479 | Faunce | Dec. 8, 1931 |
| 2,486,473 | Hart | Nov. 1, 1949 |
| 2,638,284 | Rahfuse | May 12, 1953 |